(No Model.)

W. H. KENDALL.
APPARATUS FOR DRYING HATS AND OTHER ARTICLES.

No. 358,674. Patented Mar. 1, 1887.

WITNESSES:

INVENTOR
William H. Kendall
BY
Van Santvoord & Hauff
ATTORNEYS

UNITED STATES PATENT OFFICE.

WILLIAM H. KENDALL, OF BROOKLYN, NEW YORK.

APPARATUS FOR DRYING HATS AND OTHER ARTICLES.

SPECIFICATION forming part of Letters Patent No. 358,674, dated March 1, 1887.

Application filed September 16, 1886. Serial No. 213,698. (No model.)

*To all whom it may concern:*

Be it known that I, WILLIAM H. KENDALL, a citizen of the United States, residing at Brooklyn, in the county of Kings and State of New York, have invented new and useful Improvements in Apparatus for Drying Hats and other Articles, of which the following is a specification.

The object of this invention is to provide means for rapidly and thoroughly drying hats, and I accomplish this object by means of the device or apparatus set forth in the following specification and claims, and illustrated in the accompanying drawings, in which—

Figure 1:
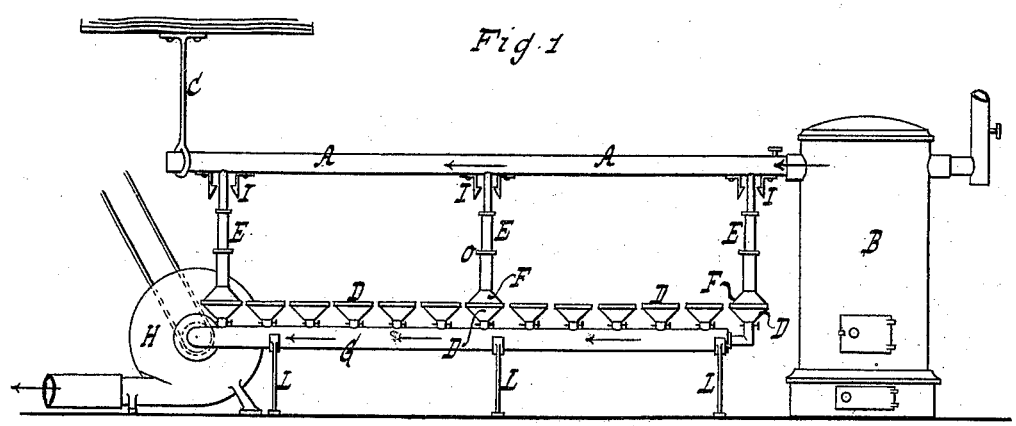
Figure 2:
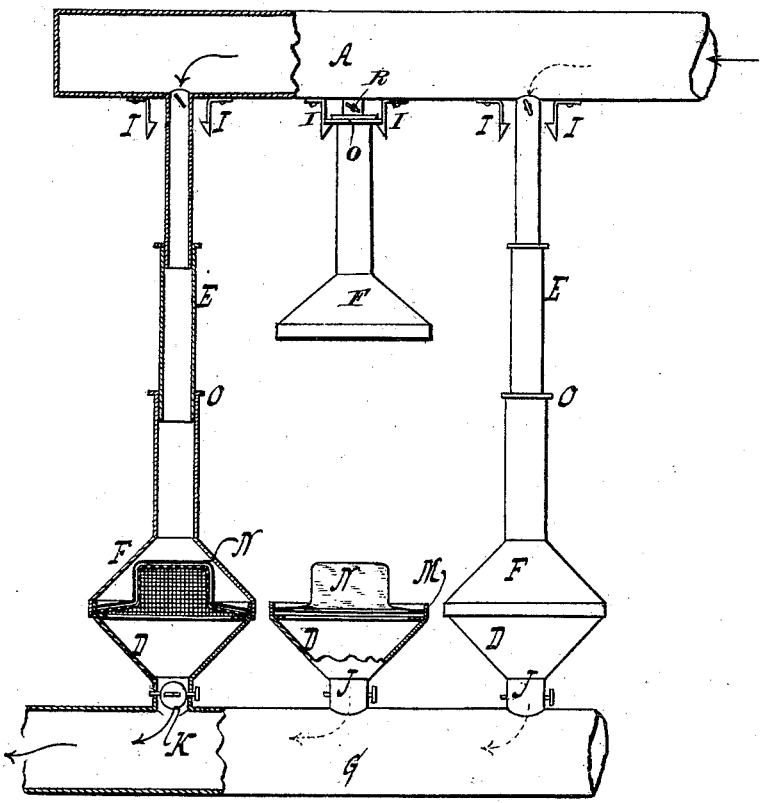

Figure 1 is a side elevation of the apparatus. Fig. 2 is a similar elevation, partly in section and on an enlarged scale, of a portion of the apparatus.

Similar letters indicate corresponding parts.

A is an air-pipe, through which air is forced or drawn, the air being first heated by being passed through a heating device or furnace, B. The pipe A connects with the heating apparatus B, and said pipe A is closed at one end. From the air-pipe A the air passes through branch pipes or channels E to the block-supports D. The block-supports D are made hollow or provided with passages through said block-supports, and with branch ducts J, communicating with the interior of the block-supports. The block-supports D are provided with ledges or rims M, on which hat-blocks N can be made to rest. By placing hats with hat-blocks upon the block-supports D, and by causing the air to pass from the heating apparatus B through the pipe A and branch pipes E through the hats upon the hat-blocks, said hats will be rapidly and thoroughly dried. The parts of the branch pipes E which are near the hats are made flaring or in the shape of hoods F, so as to set over the hats. Said pipes E and hoods or covers F are made movable, so that they can be moved out of the way when it is desired to remove hat-blocks from or place hat-blocks upon the block-supports. As seen in the drawings, a simple manner of making the branch pipes E and hoods F movable is to construct the branch pipes E from telescopic pipe-sections, which can slide or move with respect to one another. Catches or detents I are adapted to catch onto flanges O and hold the branch pipes E out of the way of the block-supports. A simple form of catch is the spring-catch I, (shown in the drawings,) and said catches are suitably attached, as, for example, to the air-pipe A.

The hat-blocks N are preferably made of wire-cloth or foraminous or porous material, to allow ready passage of the air. From the block-supports D the air escapes through branch ducts J. When it is desired to cut off the passage of the air through any block-support, the gate K of said block-support is turned or operated so as to close said passage. Said gates K are suitably applied, as, for example, to the branch ducts J. In the example shown in the drawings the branch ducts J support the block-supports D, and said branch ducts communicate with a duct, G. The duct G is suitably supported, as on supports or legs L, and the air-pipe A is also suitably supported by one or more hangers or supports, C.

The air can be forced by a suitable apparatus into the air-pipe A; but I prefer the method shown in the drawings, where a fan-blower is connected by its exhaust-opening with the duct G, thus exhausting the air in the duct G, and causing the air to flow from the heater B through the pipe A and the block-supports D.

As the gates or dampers K are so applied that each gate or damper controls one of the channels E, the passage of air through any one of the channels E can be cut off without interrupting the passage of air through any of the the other channels E.

What I claim as new, and desire to secure by Letters Patent, is—

1. The combination, in a machine for drying hats, of an air-heater, B, a main pipe, A, leading from the heater, a branch pipe, E, extending from the main pipe and carrying and supporting an attached hood, F, movable with said branch pipe, a hollow hat-block support, D, for receiving and holding a foraminous hat-block, a main duct, G, below the block-support, and a duct, J, connecting the latter with said main draft, so that the heated air from the main pipe passes through the branch pipe, the hat-block, the block-support, and the main duct, substantially as described.

2. The combination, in a machine for drying hats, of an air-heater, B, a main pipe, A, leading horizontally from the heater and closed at its outer end, a series of hollow hat-block supports, D, and a series of branch pipes, E, leading downward from the main pipe and carrying at their lower ends the hoods F, which are movable with the branch pipes to and from the hat-block supports, substantially as described.

3. The combination, in a machine for drying hats, of an air-heater, B, a main pipe, A, leading horizontally therefrom and closed at its outer end, a series of hollow hat-block supports, D, a series of branch pipes, E, leading downward from the main pipe and carrying at their lower ends the hoods F, which are movable with said branch pipes to and from the hat-block supports, a main duct, G, below the hat-block supports, and ducts J, connecting the hollow hat-block supports with said main duct, substantially as described.

4. The combination, in a machine for drying hats, of an air-heater, B, a main pipe, A, leading horizontally therefrom, the hollow hat-block supports D, having air-escape ducts J at their lower ends, the vertically-movable telescopic branch pipes E, depending from the main pipe and each carrying at its lower end a hood, F, which is movable vertically with its telescopic pipe to and from the hat-block support, substantially as described.

5. The combination, in a machine for drying hats, of an air-heater, B, a main pipe, A, leading therefrom and closed at its outer end, catches I on the main pipe, a series of hollow hat-block supports, D, and a series of telescopic pipes, E, carrying and supporting the hoods F and movable vertically to engage and disengage the catches, substantially as described.

6. The combination, in a machine for drying hats, of an air-heater, B, a main pipe, A, leading therefrom and closed at its outer end, a series of branch pipes, E, carrying and supporting at their lower ends the hoods F, which are movable with the said branch pipes, a series of hollow hat-block supports, D, having ducts, J, a main duct, G, communicating with the ducts of the hollow hat-block supports, a pan, H, connected with one end of the main duct, and dampers or valves for preventing the passage of air through one or more of the branch pipes carrying the hoods, substantially as described.

In testimony whereof I have hereunto set my hand and seal in the presence of two subscribing witnesses.

WILLIAM H. KENDALL. [L. S.]

Witnesses:
W. HAUFF,
E. F. KASTENHUBER.